(12) United States Patent
Hasler et al.

(10) Patent No.: US 8,077,891 B2
(45) Date of Patent: Dec. 13, 2011

(54) METHOD AND SYSTEM FOR ADJUSTING A HEARING DEVICE

(75) Inventors: Ivo Hasler, Winterthur (CH); Hubert Lechner, Zürich (CH); Patrick Baechler, Gutenswil (CH); Bernd Waldmann, Maur (CH); Stefan Daniel Menzl, Jona (CH); Christian Brunner, Jona (CH)

(73) Assignee: Phonak AG, Stafa (CH)

( * ) Notice: Subject to any disclaimer, the term of this patent is extended or adjusted under 35 U.S.C. 154(b) by 1394 days.

(21) Appl. No.: 11/395,788

(22) Filed: Mar. 31, 2006

(65) Prior Publication Data

US 2007/0230711 A1   Oct. 4, 2007

(51) Int. Cl.
*H04R 25/00* (2006.01)

(52) U.S. Cl. ..................... 381/315; 381/314

(58) Field of Classification Search .......... 381/60, 381/312–331
See application file for complete search history.

(56) References Cited

U.S. PATENT DOCUMENTS

| 5,210,803 | A | | 5/1993 | Martin et al. |
| 5,226,086 | A | * | 7/1993 | Platt ................... 381/58 |
| 6,115,478 | A | * | 9/2000 | Schneider ............. 381/314 |
| 7,200,237 | B2 | * | 4/2007 | Zhang et al. ........... 381/60 |
| 7,672,468 | B2 | * | 3/2010 | Kaiser et al. .......... 381/312 |
| 2002/0054689 | A1 | | 5/2002 | Zhang |
| 2005/0008175 | A1 | | 1/2005 | Hagen et al. |
| 2005/0068182 | A1 | | 3/2005 | Dunlap et al. |
| 2005/0255843 | A1 | | 11/2005 | Hilpisch |
| 2005/0283263 | A1 | | 12/2005 | Eaton |
| 2006/0098831 | A1 | * | 5/2006 | Kaiser et al. ........... 381/312 |
| 2007/0009124 | A1 | * | 1/2007 | Larsen ................ 381/315 |
| 2007/0098194 | A1 | * | 5/2007 | Schneider et al. ...... 381/315 |

FOREIGN PATENT DOCUMENTS

| EP | 1 309 222 A2 | 5/2003 |
| WO | WO 99/09799 | 3/1999 |
| WO | 2004110099 A2 | 12/2004 |

* cited by examiner

*Primary Examiner* — Curtis Kuntz
*Assistant Examiner* — Ryan Robinson
(74) *Attorney, Agent, or Firm* — Pearne & Gordon LLP

(57) ABSTRACT

A method for wirelessly adjusting one or more hearing devices (1, ..., 3) with a central unit (4) is presented, the method comprising the steps of:
  establishing a wireless network (6) wirelessly connecting the central unit (4) to hearing devices (1, ..., 3), which are responsive to said wireless network (6),
  detecting said hearing devices (1, ..., 3),
  identifying one or more of the detected hearing devices (1, ..., 3,
  selecting one or more of the identified hearing devices (1, ..., 3),
  establishing a wireless link from the central unit (4) to at least one of the identified hearing devices (1, ..., 3), and
  adjusting the at least one identified hearing device (1, ..., 3).

Therewith, an audiologist is able to unambiguously assign one or two hearing devices (1, ..., 3) in a fitting session, even if multiple hearing devices are within the range of the wireless network (6) or wireless transmitter, respectively.

19 Claims, 2 Drawing Sheets

METHOD AND SYSTEM FOR ADJUSTING A HEARING DEVICE

TECHNICAL FIELD OF THE INVENTION

The present invention is directed to a method for wirelessly adjusting one or more hearing devices with a central unit as well as to a system for adjusting one or more hearing devices.

BACKGROUND OF THE INVENTION

It is generally known that a person's hearing loss is not normally uniform over the entire frequency spectrum of hearing. For example, in typical noise-induced hearing loss, the hearing loss is typically greater at higher frequencies than at lower frequencies. The degree of hearing loss at various frequencies varies with individuals. The measurement of an individual's hearing ability can be illustrated by an audiogram. An audiologist, or other hearing health professionals, will measure an individual's perceptive ability for differing sound frequencies and differing sound amplitudes. A plot of the resulting information in an amplitude/frequency diagram will graphically represent the individual's hearing ability, and will thereby represent the individual's hearing loss as compared to an established range of normal hearing for individuals. In this regard, the audiogram represents graphically the particular auditory characteristics of the individual. Other types of measurements relating to hearing deficiencies may be made.

Since individuals have differing hearing abilities with respect to each other, and oftentimes have differing hearing abilities between the right and left ears, it is normal to have some form of adjustment of the hearing devices to compensate for the characteristics of the hearing of the individual.

Numerous types of adjustable hearing devices are known. As such, details of the specifics of adjusting functions will not be described in detail.

The adjustment of hearing devices can be made in several ways. First, it has been known to have the manufacturer establish a computer-based programming function at its factory or outlet centers. In this form of operation, the details of the individual's hearing readings, such as the audiogram that has been obtained by the audiologist, are forwarded to the manufacturer for use in making the adjustments. Once adjusted, the hearing device or hearing devices are then sent back to the audiologist or directly to the intended user. Such an operation clearly suffers from the disadvantage of the loss of time in the transmission of the information and the return of the adjusted hearing device. In addition, an interactive adjustment involving the audiologist and the hearing device user is usually not possible. Furthermore, such arrangements characteristically deal only with the adjustment of the particular manufacturer's hearing devices, and are not readily adaptable for adjusting various types of hearing devices.

Yet another type of prior art programming system is utilized wherein the programming system is located near the audiologist who directly adjusts the hearing device for the hearing device user. In such an arrangement, it is common for each location to have a general purpose computer especially programmed to perform the adjustment function and provide it with an interface unit hard-wired to the computer for providing the programming function to the hearing device. In this arrangement, the hearing professional enters the audiogram or other patient-related hearing information into the computer, and thereby allows the computer to calculate the auditory parameters that will be optimal for the predetermined listening situations for the individual. The computer then directly programs the hearing device. Such specific programming systems and hard-wired interrelationship to the host computer are costly and do not lend themselves to ease of altering the programming functions.

Other types of programming or adjusting systems wherein centralized host computers are used to provide programming access via telephone lines and the like are also known, and suffer from many of the problems of cost, lack of ease of usage, lack of flexibility in reprogramming, and the like.

Known methods for adjusting hearing devices are disclosed, for example, by WO 99/09 799 and by U.S. Pat. No. 5,210,803. Other types of devices having a self-identification feature for device detection are disclosed, for example, by EP-1 309 222 A2 and by US 2005/0068182.

Furthermore, US 2005/000 81 75 A1 discloses a system for programming hearing devices with a host computer that is wirelessly connectable to the hearing devices via a hearing device programmer. This known system bears the risk that the hearing device programmer connects to the wrong hearing device resulting in malfunctions due to bad or wrong adjustment of the hearing device.

It is therefore an object of the present invention to provide a method for adjusting one or more hearing devices, which method does not have the above-mentioned disadvantages.

SUMMARY OF THE INVENTION

The inventive method for wirelessly adjusting one or more hearing devices with a central unit comprises the steps of:
  establishing a wireless network wirelessly connecting the central unit to hearing devices, which are responsive to said wireless network,
  detecting said hearing devices,
  identifying one or more of the detected hearing devices,
  selecting one or more of the identified hearing devices,
  establishing a wireless link from the central unit to at least one of the identified hearing devices, and
  adjusting the at least one identified hearing device.

Therewith, the audiologist is able to unambiguously assign one or two hearing devices in a fitting session, even if multiple hearing devices are within the range of the wireless network or wireless transmitter, respectively.

It is expressly pointed out that the term "hearing device" does not only mean a device which is inserted into a user's ear to improve the hearing ability of a hearing impaired person, but also any accessory device used in connection with the device inserted into the user's ear, as for example a remote control. In addition, the term "hearing device" may also mean a communication device or an ear protection device, which is inserted into the ear canal. Thereby, it is independent on the fact whether the hearing device is inserted into the ear canal or whether it is implanted into the inner ear, for example.

In a more specific embodiment of the present invention, the method comprises the step of displaying the detected hearing devices, preferably with additional identifier such as a model identifier or a serial number pertaining to the detected hearing device. Therewith, a list of the detected hearing devices is presented to the audiologist in order to give him or her an overview of the available hearing devices that are detected at present.

In another embodiment of the present invention, the step of identifying a detected hearing device comprises the steps of:
  instructing, via the central unit, a detected hearing device to emit a signal, which preferably is an acoustic signal, and
  assigning the instructed hearing device to the physical hearing device that emitted said signal.

In yet another embodiment of the present invention, the step of identifying a detected hearing device comprises the steps of:
- stimulating a radio frequency identification tag provided at each detected hearing device to emit a radio frequency response containing an identification code,
- receiving the radio frequency response, and
- assigning the stimulated hearing device to the corresponding physical hearing device to which the identification code belongs.

In a still further embodiment of the present invention, the step of identifying a detected hearing device comprises the steps of:
- stimulating one of the detected hearing devices,
- monitoring the detected hearing devices in the central unit for a response of the stimulation,
- determining the hearing device in the central unit, for which hearing device a response has been detected, and
- assigning the stimulated hearing device to the determined hearing device).

Several possibilities exist how to stimulate the hearing device: provoking a feedback, operating a remote control, actuating volume control, actuating program select switch, inserting a battery, closing a battery door. A combination of two or more possibilities can be required.

In a further embodiment of the present invention, the wireless network has a limited range such that only one hearing device is detected at the same time.

In a still further embodiment of the present invention, the step of identifying a detected hearing device comprises the steps of:
- displaying an additional identifier of the detected hearing devices, said additional identifier being indicated on the hearing device housings,
- comparing one or more displayed identifier to the ones indicated on the hearing device housings, and
- assigning a displayed detected hearing device to the physical hearing device having identical additional identifiers.

Furthermore, a system for wirelessly adjusting one or more hearing devices with a central unit is also provided. Such a system comprises:
- a central unit,
- one or more hearing devices,
- means for establishing a wireless network wirelessly connecting the central unit to hearing devices, which are responsive to said wireless network,
- means for detecting said hearing devices,
- means for identifying one or more of the detected hearing devices,
- means for selecting one or more of the identified hearing devices,
- means for establishing a wireless link from the central unit to at least one of the identified hearing devices, and
- means for adjusting the at least one identified hearing device.

In an embodiment of the inventive system, means for displaying the detected hearing devices, preferably with additional identifier such as a model identifier or a serial number pertaining to the detected hearing device, are provided.

In another embodiment of the system according to the present invention, the means for identifying a detected hearing device comprise:
- means for instructing, via the central unit, a detected hearing device to emit a signal, which preferably is an acoustic signal, and
- means for assigning the instructed hearing device to the physical hearing device that emitted said signal.

In yet another embodiment of the system according to the present invention, the means for identifying a detected hearing device comprise:
- means for stimulating a radio frequency identification tag provided at each detected hearing device to emit a radio frequency response containing an identification code,
- means for receiving the radio frequency response, and
- means for assigning the stimulated hearing device to the corresponding physical hearing device to which the identification code belongs.

In still another embodiment of the present invention, the means for identifying a detected hearing device comprise:
- means for stimulating one of the detected hearing devices,
- means for monitoring the detected hearing devices in the central unit for a response of the stimulation,
- means for determining the hearing device in the central unit, for which hearing device a response has been detected, and
- means for assigning the stimulated hearing device to the determined hearing device.

Again, several possibilities exist how to stimulate the hearing device: provoking a feedback, operating a remote control, actuating volume control, actuating program select switch, inserting a battery, closing a battery door. A combination of two or more possibilities can be required.

In a further embodiment of the system according to the present invention, the wireless network has a limited range such that only one hearing device is detectable at the same time.

In a still further embodiment of the system according to the present invention, the means for identifying a detected hearing device comprise:
- means for displaying an additional identifier of the detected hearing devices, said additional identifier being indicated on the hearing device housings,
- means for comparing one or more displayed identifier to the ones indicated on the hearing device housings, and
- means for assigning a displayed detected hearing device to the physical hearing device having identical additional identifiers.

The present invention is further explained in more detail by referring to drawings illustrating exemplified embodiments of the present invention.

DETAILED DESCRIPTION OF THE INVENTION

Figure 1:
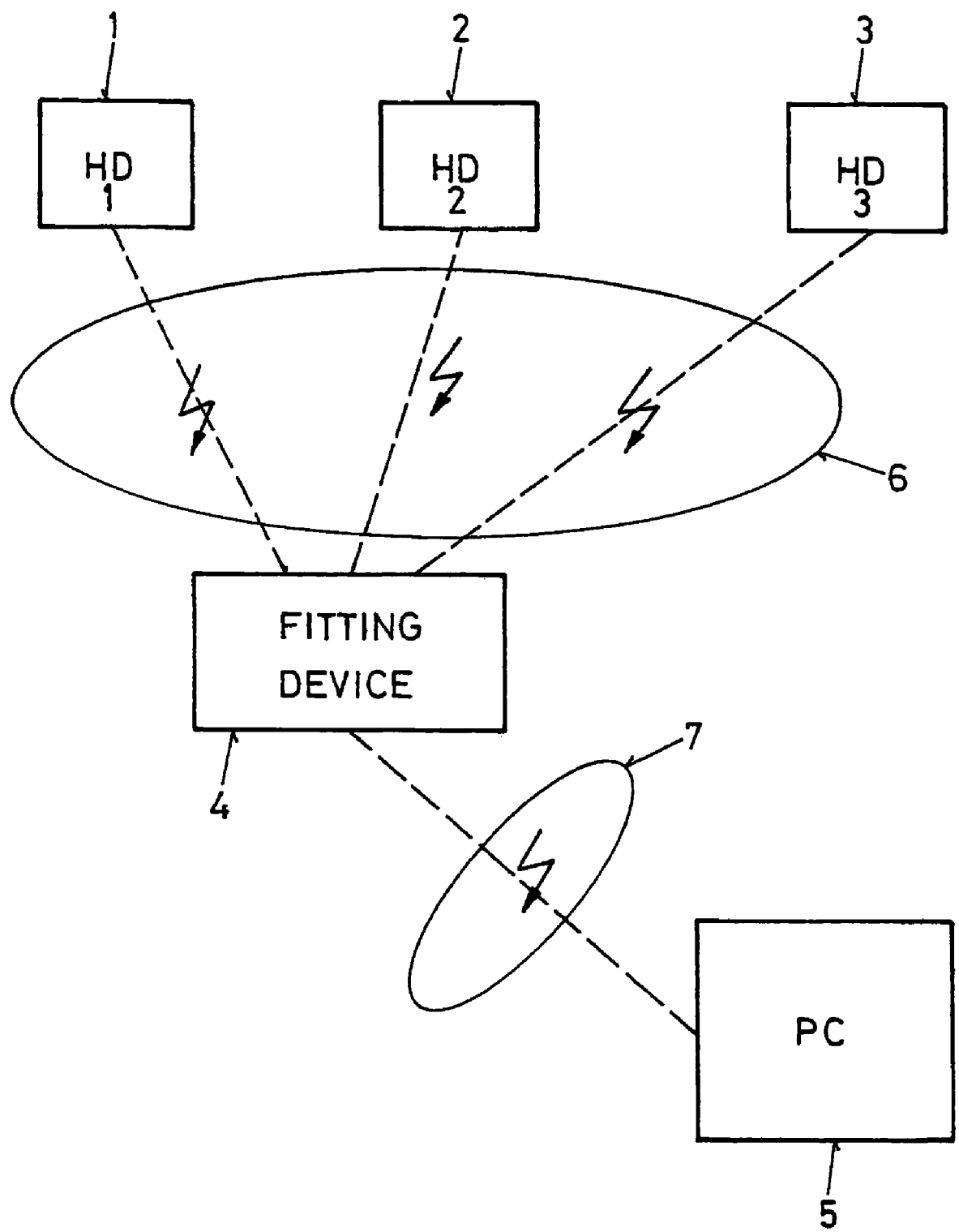
FIG. 1 schematically shows a system for adjusting one or more hearing devices.

FIG. 1 shows three hearing devices 1, 2 and 3, a central unit 4—also called fitting device—and a host computer 5, which can be a commercially available computer, e.g. a personal computer or a notebook. It is expressly pointed out that the central unit 4 and the host computer 5 can be a single unit. Therefore, whenever the term "central unit" is used in this specification, the meaning is not only limited to the intermediate unit (i.e. the fitting device) but may also include a part or the whole host computer 5 in combination with the central unit 4 (i.e. the fitting device).

As is depicted in FIG. 1, the central unit 4 and the host computer 5 are interconnected via a connection 7, which is either implemented as a wireless or as a wired connection. Numerous possibilities exist for implementing this connection. For example, a connection via a so called Bluetooth device, which is a wireless interconnection, a cable using a USB—(Universal Serial Bus)—interface, or—to mention another wireless network—a network implemented according to the IEEE-802.11 standard, which is also called WLAN—(Wireless Local Area Network).

In case of an inventive system with a fitting device and a host computer 5, as it is depicted in FIG. 1, software applications, e.g. a fitting program to adjust a hearing device 1 to 3, are running on the host computer 5 that is standardized to a large extent (e.g. a personal computer), whereas specific hardware that is needed in some cases to adapt to specific data transmission to the hearing devices 1 to 3, is realized in the fitting device or the central unit 4, respectively.

According to the present invention, the hearing devices to be adjusted to the needs of an intended user are connected via a wireless connection to the central unit 4. Therefore, a wireless network 6 is provided that is implemented to be in line with either proprietary or open standards. As open standards for wireless networks, the above-mentioned standards that have been mentioned in connection with the interconnection between the host computer 5 and the fitting device—i.e. Bluetooth, WLAN, etc.—can very well be used.

The central unit 4 is able to establish a wireless connection to the hearing devices 1 to 3 on condition that these hearing devices 1 to 3 are responsive to the wireless network 6. Depending on the range of the network 6, further hearing devices might be detected that are not needed for an adjustment process. After the detection of all hearing devices in a specific range of the network 6, the hearing devices are unambiguously identified. This will be further described by several ways of implementation. By the step of identifying one or more hearing devices, the risk of adjusting a wrong hearing device 1, 2, 3 is eliminated. Once the hearing devices are identified, a desired hearing device is selected for the adjustment, and a wireless link can be established between the central unit 4 and the selected hearing device. In a further step, the adjustment can be made by downloading specific parameters and/or hearing programs.

It is pointed out that the term "detect a hearing device" means the awareness of the system that a hearing device is present, and the term "identify a hearing device" means the unambiguous assignment of a detected hearing device to its physical counterpart. The assignment is thereby not only unambiguous for the system but also for the audiologist carrying out the adjustment of the hearing device. In addition, the term "identify a hearing device" may also mean that further information must be provided to the inventive system in order that an unambiguous assignment can be completed. Such information can be, for example, the indication whether a hearing device will be or is inserted into the ear canal of the left ear of the user, into the ear canal of the right ear of the user, or whether a hearing device will not be inserted at all, for example in cases with detected hearing device which will not be adjusted in the current fitting session.

The step of identifying a hearing device 1 to 3 can be performed in several ways:

A first way to identify detected hearing devices is to instruct one hearing device to emit a signal, which preferably is an acoustic signal in the manner of a jingle, for example, which is very easily identifiable. The acoustic signal is generated by a loud speaker, for example the loudspeaker that is integrated into the hearing device and that is often called receiver in the technical field of hearing devices. The instruction for the hearing device to generate the signal is given by the central unit 4, which is controlled by the audiologist during the fitting session. Once the audiologist perceives the signal, he or she can match or assign the hearing device detected by the system to the hearing device that emitted the signal. The audiologist can instruct one detected hearing device after the other to generate a signal and thereby identify all detected hearing devices, or he can stop instructing further hearing devices to emit a signal as soon as all relevant hearing devices are identified, i.e. as soon as the hearing devices are identified, which will be adjusted during the present fitting session.

A second way to identify detected hearing devices is based on a so called RFID—(Radio Frequency Identification)—technique. An unambiguous RFID-tag, which is either active or passive, is provided at each or in each of the hearing devices to be identified. By stimulating a passive RFID-tag using a specific radio frequency signal, a response signal being also a radio frequency signal containing the identification code is generated. For active RFID-tags, no stimulation is necessary because an active RFID-tag emits a response signal on its own. The response signal is detected, i.e. the identification code is received by a receiving unit (not shown in FIG. 1) incorporated into the central unit 4. Therewith, the basis for assigning the stimulated hearing device to the corresponding physical hearing device is given.

In order to prevent any wrong assignment, a RFID-technique can be applied that only allows short range identification of a RFID-tag, i.e. the hearing device carrying the tag to be identified must be brought in close proximity to a RF-transmitter in order to obtain a RF-response signal carrying the identification code. Therewith, different RF-response signal may not be mixed.

A third way to identify detected hearing devices is to stimulate one of the detected hearing devices, while monitoring the detected hearing devices for a corresponding response to the stimulation in the central unit 4 at the same time. The hearing device, for which a corresponding response has been detected, is determined in the central unit 4. Based on this information, the stimulated hearing device can be assigned to the determined hearing device, which completes the identification.

It is pointed out that one or several of the following stimulation can be used to identify the hearing devices according to the third way:

A feedback signal can be provoked in the hearing device.

Operating a remote control which acts on the hearing device to be detected.

Tapping on the housing of the hearing device to be identified. The tapping is captured by a microphone of the hearing device and the resulting electrical signal is transmitted to the central unit 4, where it is monitored.

Actuating a switch provided on the hearing device. This might well be a program switch which is later used to switch from one hearing program to another.

Inserting a battery and thereby initiating first operation sequences might also be used as a stimulation to be monitored.

Closing a battery door results in a similar behavior as the one for inserting a battery.

A fourth way to identify detected hearing devices is to limit the range of the wireless network 6 in such a way that only one hearing device can be detected at the same time. This can be accomplished by causing the central unit 4 to enter a special mode with a rather small wireless range of the network 6, for example less than 10 cm, and the audiologist places the designated hearing device in close proximity of the central unit 4 or the transceiver contained therein, respectively, or the audiologist places the central unit 4 or the transceiver, respectively, in close proximity of the designated hearing device. The latter is appropriate in case the designated hearing device has already been inserted into the user's ear. This fourth way for identifying a hearing device is unambiguous, easy to implement and also easy to use.

A fifth way to identify the detected hearing device is by manually comparing the information automatically read out of the hearing device by the central unit 4 and the information indicated on the outside surface of the hearing device housing. The audiologist can read and compare this information to the information automatically read out of the hearing devices, thereby assigning the hearing device with identical information. For example, the serial number of the hearing device is often indicated on the outside surface of the hearing device housing and can therefore very well be used as information for the assignment. Other unique identification of the hearing devices can also be used. The assignment of the corresponding hearing devices is very reliable and technically rather easy to implement.

Figure 2:
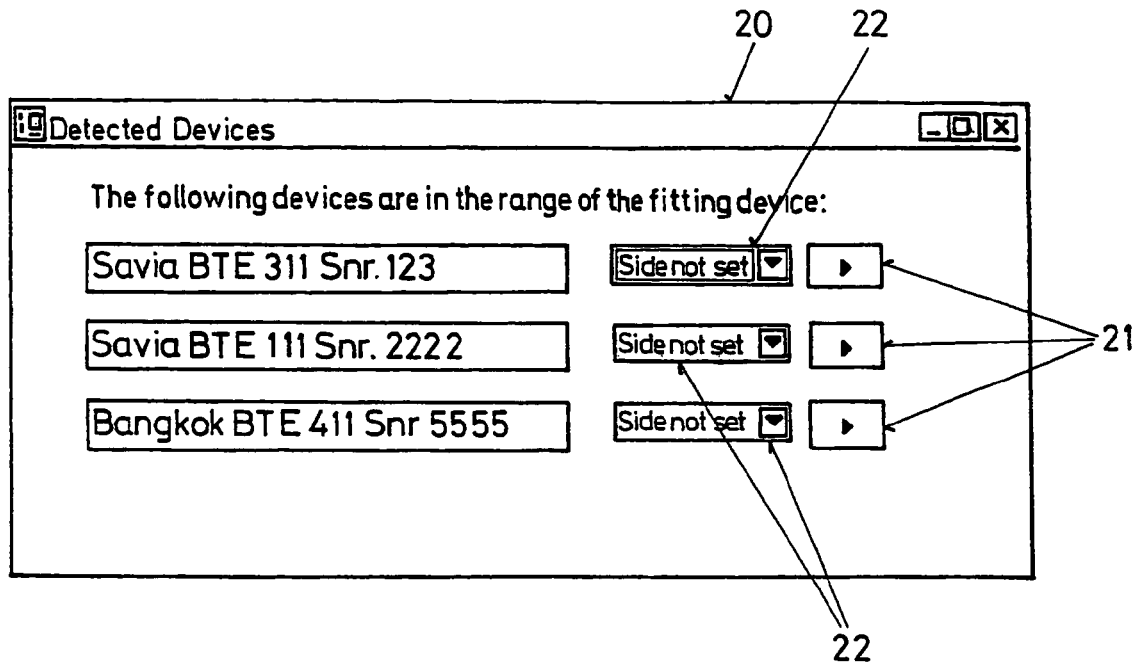
FIG. 2 shows a first screen shot of a software application controlling the hearing devices.
Figure 3:
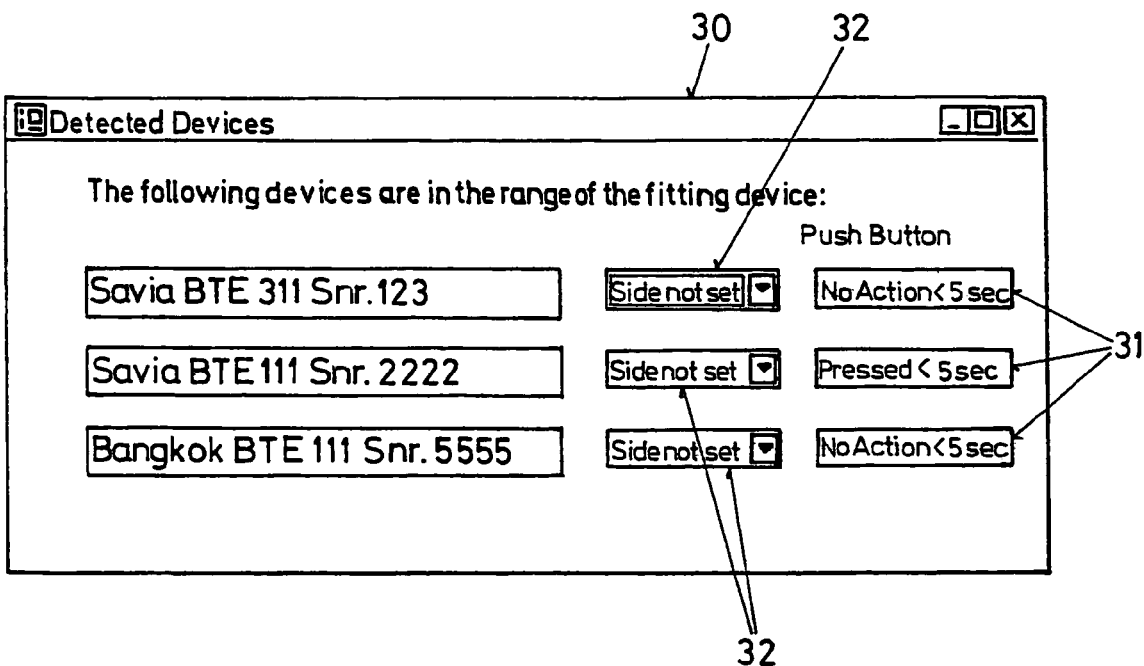
FIG. 3 shows a second screen shot of another software application controlling the hearing devices.

FIGS. 2 and 3 show screen shots of a software application controlling the adjustment during a detection and identification process. The screen shots depict a so called window 20, 30, as it is well known from Microsoft or Apple Computers, Inc., for example, with three hearing devices detected within the range of the network 6. The detected hearing devices are listed with its product names (Savia), the type of the hearing device (BTE for Behind-the-Ear), a reference number (e.g. 311), and the serial number of the hearing devices (e.g. 123). In case that more than three hearing devices are detected, the window 20, 30 will automatically enlarge to show all detected hearing devices. Alternatively, or in case there is not enough space to show all detected hearing devices, a scroll bar is provided to scroll through the detected hearing devices (not shown in FIGS. 2 and 3).

In FIG. 2, a window 20 is shown which is particularly suitable for the above-described first way to identify detected hearing devices. The audiologist, to whom the window 20 according to FIG. 2 is presented, can instruct one of the listed hearing devices by pressing a button 21, which is located to the right side of the row showing the particular hearing device. By pressing this button 21 a signal is emitted in the hearing device listed in this row of window 20. As has already been pointed out, the signal is preferably an acoustic signal in the manner of a jingle, for example.

Once a hearing device is identified and selected for adjusting, further information is provided for this hearing device regarding its location, e.g. whether it is used on the left or on the right ear. For easy information input into the central unit 4, a drop down menu 22 is presented to the audiologist after clicking onto the downward arrow on the same row as the hearing device information is presented (see FIG. 2). The drop down menu 22 preferably contains three offered selections: "Left Side", "Right Side" and "Side not set". As a default, the selection will be set to "Side not set", which means that this hearing device will not be used in the subsequent adjustment. The audiologist can now change this default setting to another selection. For a binaural or bilateral hearing system, for which two hearing devices are used, the audiologist has to assign one hearing device to the right ear and another hearing device to the left ear. Once the two hearing device are identified which will be used for the binaural or bilateral hearing device, the corresponding position is indicated for each of the two hearing devices in the drop-down menu 22 as described above. Therewith, the identification is completed and the adjustment of the hearing device can begin after a wireless link has been established from the central unit 4 to the two identified hearing device belonging to the binaural or bilateral hearing system.

In FIG. 3, a window 30 is shown which is particularly suitable for the above-described third way to identify detected hearing devices. The audiologist, to whom the window 30 according to FIG. 3 is presented, can stimulate one of the detected hearing devices by one or several of the predefined stimulating actions described in connection with this third way to identify detected hearing devices. The monitoring of a response due to the stimulation is performed by the central unit 4 and the result of this monitoring is presented in the last column 31 of the listed detected hearing devices. As can be seen from FIG. 3, the second hearing device of the list has been stimulated in this example. This is indicated by the information "Pressed<5 sec" in the last column 31. Accordingly, the stimulated hearing device is the one with serial number 2222. In case this hearing device is the one or one of the two hearing devices to be used for the subsequent adjustment, the audiologist again selects in the drop-down 33 on the same line as the identified hearing device and assigns the desired position, which again is "Left Side" or "Right Side". In case of a binaural or bilateral hearing device, the audiologist stimulates—e.g. by pressing volume control or the like—the second hearing device. Again, the result is entered into the last column 31 of the list of detected hearing devices, and, as a last step, the desired side is again selected in the drop-down menu 33 by the audiologist. Therewith, both hearing devices are accurately assigned and the adjustment phase for these hearing devices can be undertaken. The fitting program guides the audiologist through the fitting or adjustment process.

Although there is no specific example for a window which is presented to the audiologist during the identification phase implemented according to the first, the fourth and the fifth way to identify detected hearing devices, it is pointed out that such windows and its content will be deducible by the skilled artisan given the information above in connection with the second and third way to identify detected hearing devices.

The invention claimed is:
1. A method for wirelessly adjusting one or more hearing devices with a central unit, the method comprising the steps of:
    establishing a short-range wireless network for wirelessly and concurrently connecting the central unit to a plurality of hearing devices which are responsive to said wireless network,
    detecting said hearing devices,
    identifying one or more of the detected hearing devices for selecting a subset of said detected hearing devices,
    displaying the detected hearing devices;
    establishing a wireless link from the central unit to the identified hearing device(s) in said subset, and
    adjusting parameters of the hearing device(s) in said subset to adapt the hearing device(s) in said subset to the needs of the intended user.

2. The method of claim 1, wherein said: displaying of the detected hearing devices includes displaying an identifier number pertaining to the detected hearing device.

3. The method of claim 1, wherein the step of identifying a detected hearing device comprises the steps of:
    instructing, via the central unit, a detected hearing device to emit, an acoustic signal, and
    assigning the instructed hearing device to the physical hearing device that emitted said signal.

4. The method of claim 1 or 2, wherein the step of identifying a detected hearing device comprises the steps of:
  stimulating a radio frequency identification tag provided at each detected hearing device to emit a radio frequency response containing an identification code,
  receiving the radio frequency response, and
  assigning the stimulated hearing device to the corresponding physical hearing device to which the identification code belongs.

5. The method of claim 1, wherein the step of identifying a detected hearing device comprises the steps of:
  stimulating one of the detected hearing devices,
  monitoring the detected hearing devices in the central unit for a response of the stimulation,
  determining the hearing device in the central unit, for which hearing device a response has been detected, and
  assigning the stimulated hearing device to the determined hearing device.

6. The method of claim 5, wherein the hearing device is stimulated in one or more of the following manners:
  provoking a feedback,
  operating a remote control,
  actuating volume control,
  actuating program select switch,
  inserting a battery,
  closing a battery door.

7. The method of claim 1, wherein the wireless network has a limited range such that only one hearing device is detected at the same time.

8. The method of claim 2, wherein the step of identifying a detected hearing device comprises the steps of:
  displaying an additional identifier of the detected hearing devices, said additional identifier being indicated on the hearing device housings,
  comparing one or more displayed identifier to the ones indicated on the hearing device housings,
  assigning a displayed detected hearing device to the physical hearing device having identical additional identifiers.

9. A system for wirelessly adjusting one or more hearing devices with a central unit, the system comprising:
  a central unit,
  a plurality of hearing devices,
  a wireless network wirelessly connecting the central unit to said plurality of hearing devices which are responsive to said wireless network,
  means for detecting said hearing devices,
  means for displaying the detected hearing devices;
  means for identifying a subset of one or more of the detected hearing devices for use by an intended user,
  means for establishing a wireless link from the central unit to the hearing device(s) of said subset, and
  means for adjusting parameters of the hearing device(s) of the subset for adapting to the specific needs of the intended user.

10. The system of claim 9, wherein said means for displaying the detected hearing devices displays an identifier number pertaining to the detected hearing device.

11. The system of claim 9, wherein the means for identifying a detected hearing device comprise:
  means for instructing, via the central unit, a detected hearing device to emit a signal, which preferably is an acoustic signal, and
  means for assigning the instructed hearing device to the physical hearing device that emitted said signal.

12. The system of claim 9, wherein the means for identifying a detected hearing device comprise:
  means for stimulating a radio frequency identification tag provided at each detected hearing device to emit a radio frequency response containing an identification code,
  means for receiving the radio frequency response, and
  means for assigning the stimulated hearing device to the corresponding physical hearing device to which the identification code belongs.

13. The system of claim 9, wherein the means for identifying a detected hearing device comprise:
  means for stimulating one of the detected hearing devices,
  means for monitoring the detected hearing devices in the central unit for a response of the stimulation,
  means for determining the hearing device in the central unit, for which hearing device a response has been detected, and
  means for assigning the stimulated hearing device to the determined hearing device.

14. The system of claim 13, characterized in that the means for stimulating the hearing device stimulate the hearing device in one or more of the following manners:
  provoking a feedback,
  operating a remote control,
  actuating volume control,
  actuating program select switch,
  inserting a battery,
  closing a battery door.

15. The system of claim 9, wherein the wireless network has a limited range such that only one hearing device is detectable at the same time.

16. The system of claim 10, wherein the means for identifying a detected hearing device comprise:
  means for displaying an additional identifier of the detected hearing devices, said additional identifier being indicated on the hearing device housings,
  means for comparing one or more displayed identifier to the ones indicated on the hearing device housings, and
  means for assigning a displayed detected hearing device to the physical hearing device having identical additional identifiers.

17. A method for wirelessly adjusting one or more hearing devices with a central unit, the method comprising the steps of:
  providing a wireless network,
  automatically detecting a plurality of hearing devices in geographic proximity with each other to create a list of detected hearing devices,
  associating one or more of the plurality of hearing devices with a corresponding one of the detected hearing devices on the list to determine a subset of one or more of said detected hearing devices to be used by an intended user, wherein said subset of hearing device(s) is fewer than all of said detected hearing devices,
  establishing a particular wireless link from the central unit to the subset of hearing device(s) for adjusting parameters of said subset of hearing device(s) without adjusting parameters of the detected hearing devices not a member of said subset of hearing device(s).

18. The method of claim 17, wherein said associating is accomplished by one or more of the following steps:
  provoking a feedback in said hearing devices,
  operating a remote control associated with said hearing devices,
  actuating volume control on said hearing devices,
  actuating program select switch associated with said hearing devices, inserting a battery in said hearing devices,
closing a battery door of said hearing devices,
activating an RFID element in said hearing devices,
instructing, using the central unit, the hearing devices to emit a signal,
moving the hearing devices into a particular proximity.

19. The method of claim 17, wherein said subset of hearing device(s) are for use by a specific intended user, and wherein said parameters are adjusted to adapt the subset of hearing device(s) to the needs of the specific intended user.

* * * * *